Dec. 17, 1957  W. J. DIEHL  2,816,516
STATION SELECTING SIGNAL APPARATUS FOR
TRUCK CONVEYOR SYSTEMS
Filed April 24, 1953  3 Sheets-Sheet 1
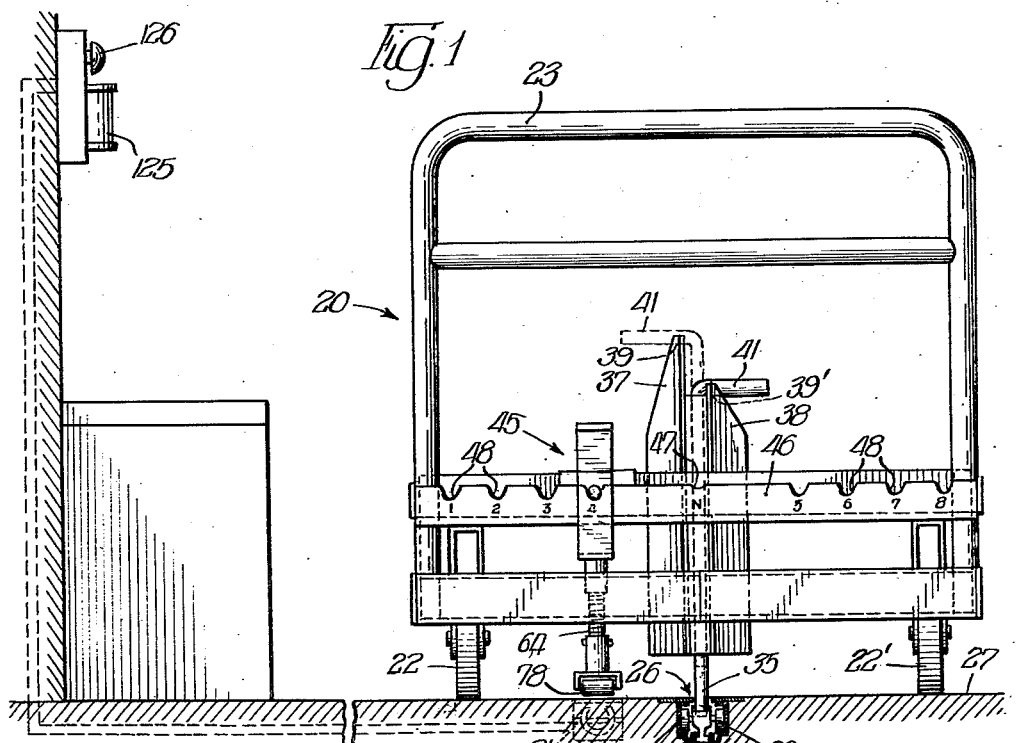
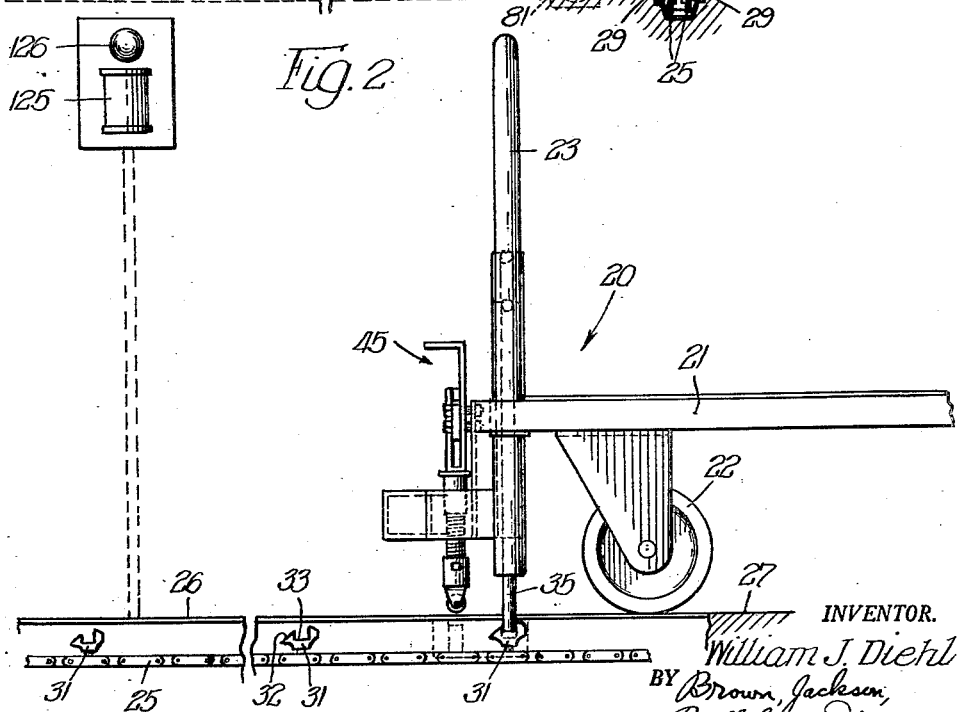
INVENTOR.
William J. Diehl
BY Brown, Jackson,
Boettcher & Dienner

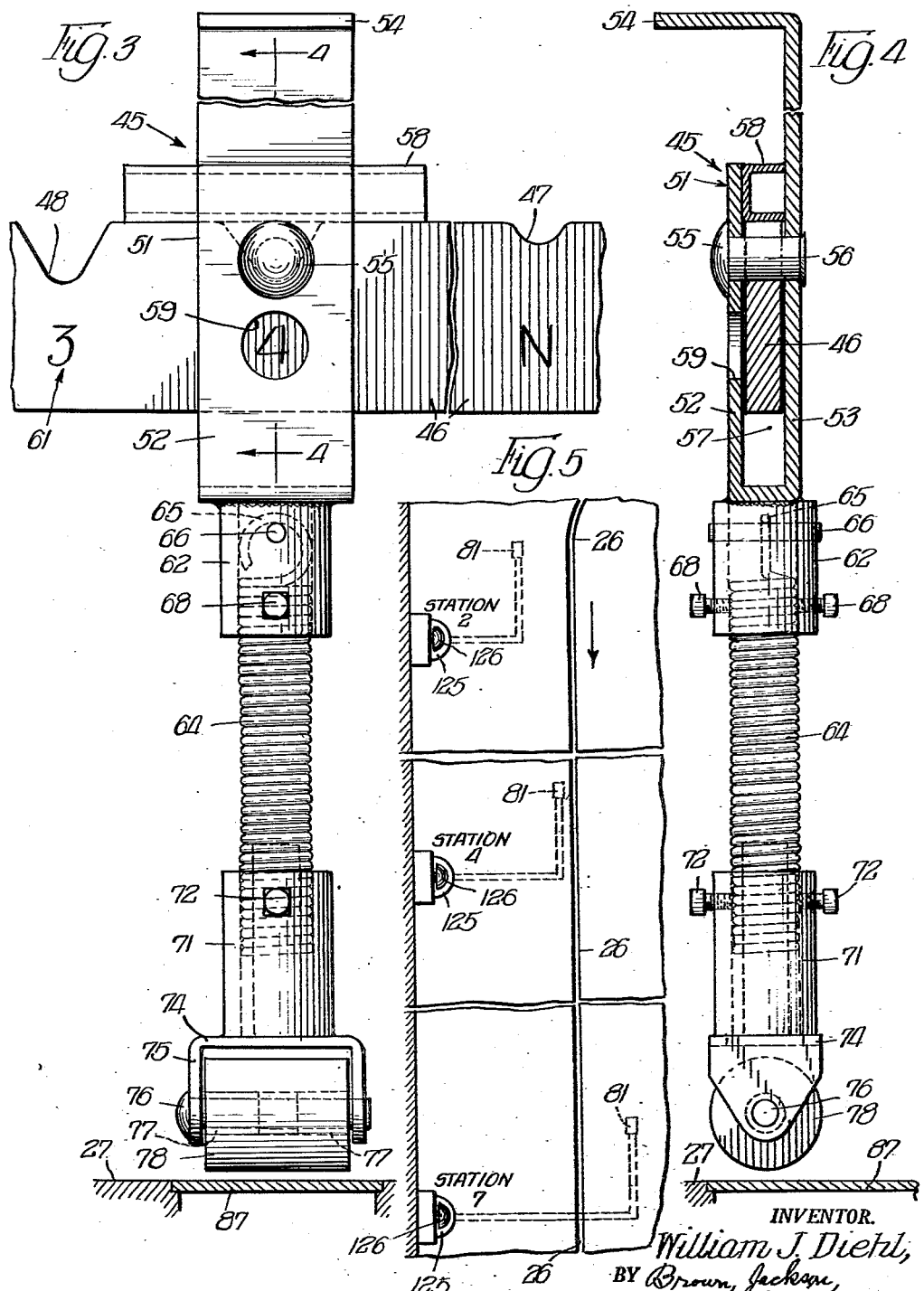

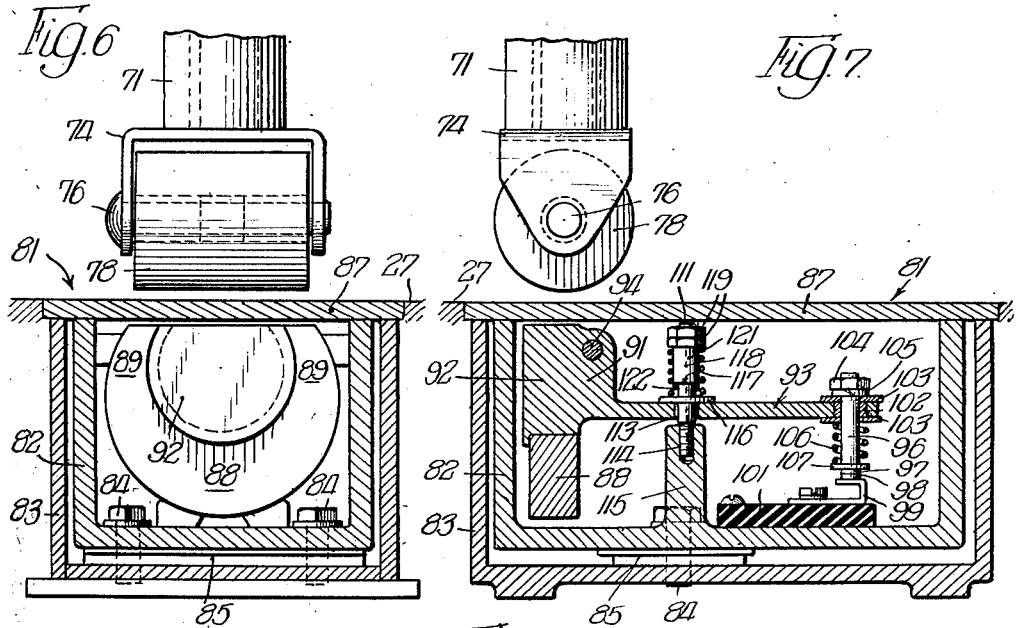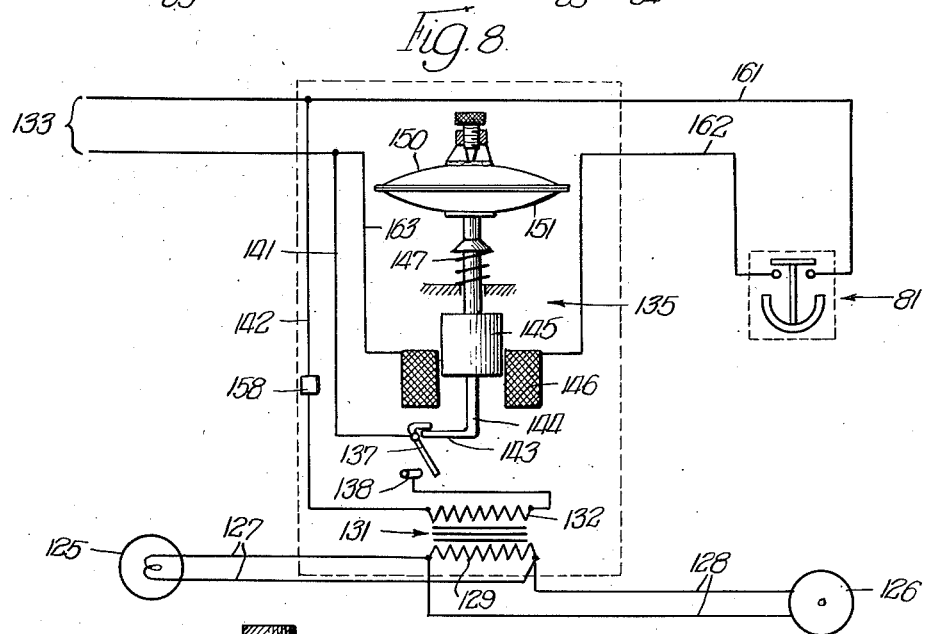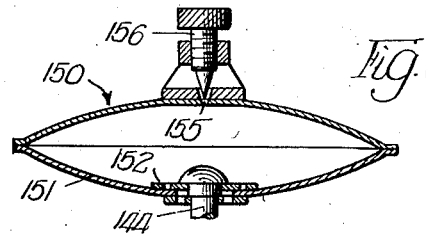

United States Patent Office 2,816,516
Patented Dec. 17, 1957

2,816,516

STATION SELECTING SIGNAL APPARATUS FOR TRUCK CONVEYOR SYSTEMS

William J. Diehl, Aurora, Ill., assignor to Richards-Wilcox Manufacturing Company, Aurora, Ill., a corporation of Illinois Application April 24, 1953, Serial No. 351,014

7 Claims. (Cl. 104—88)

The present invention relates to station selecting signal apparatus for truck conveyor systems.

The invention has particular application to conveyor systems of the floor truck type now in extensive use in warehouses, assembly plants, factories and the like wherein a series of floor trucks are propelled to successive stations located at spaced points along a predetermined line of travel of the floor trucks. The trucks are propelled along this predetermined line of travel by an endless conveyor chain which travels in a chain slot recessed in the floor, and the trucks can be coupled to and uncoupled from this conveyor chain at any of the several stations or at any other point located along the line of travel of the chain. At these stations any number of different operations may be performed with respect to certain trucks or the cargoes carried thereon. For example, cargo may be loaded upon a particular truck at a particular station, or unloaded therefrom, or certain assembly operations may be performed at one or more particular stations upon apparatus carried by certain trucks. My invention can also be embodied in conveyor systems using an overhead conveyor chain, rather than a floor type conveyor chain.

In these conveyor systems there is need for improved selective signalling apparatus which will serve to indicate to an attendant at a particular station that a particular truck is approaching or has arrived at his station, whereby he or other employees do not have to watch for particular trucks, but can remain occupied with other duties until the particular truck arrives at that station.

The general object of the present invention is to provide improved selective signalling apparatus of this general type which can be preset to give an indicating signal to the attendant at a preselected station, so as to alert him to the fact that a particular truck is approaching his station, or has arrived at his station, relative to which he should perform loading or unloading operations, assembly operations or the like.

Another object of the invention is to provide such a selective signalling apparatus which can have its selective setting readily changed by the attendant at any station along the route, so that after the attendant at that station has performed his particular loading or unloading operations he can change the selective signal setting on the truck, so that a selective signal operation will be performed at another station further along the line. For example, the truck may be given an initial signal setting for indicating its arrival at station No. 2; the attendant at that station, after performing the loading or unloading operation, may give the truck another signal setting for indicating its arrival at station No. 4; and the operator at station No. 4, after performing his duties with respect to the truck or its cargo, may give the truck a different signal setting for indicating its arrival at station No. 7, or any other station further along the route. When the operations to be performed at any particular station would require that the truck remain at that station for an appreciable interval of time, the truck can be instantly disconnected from the towing chain in the floor and wheeled off to one side out of the path of travel of succeeding trucks.

A further object of the invention is to provide such signalling apparatus which does not require the use of switch actuating fingers or the like projecting upwardly from the surface of the floor in position to be engaged by the truck, which projecting fingers are likely to be stumbled over or may be injured by trucks or other objects striking them from the side or at an angle, etc. My improved signalling apparatus avoids the necessity of any such projecting fingers by using improved floor switches of a magnetically actuated type.

Still another object of the invention is to provide improved signalling apparatus which can be preset or adjusted at each station so as to give a signal of any desired duration at that individual station when responding to the arrival of a particular truck. Thus, the duration of the signal may be used to differentiate between signals at stations located close together. In this regard, different types of bells or gongs may be used. Also, if it is likely that duties will take the attendant away from that station for short periods, the signal interval may be adjusted to be of sufficient duration to alert him when he returns.

Other objects, features and advantages of my invention will appear from the following description of one preferred embodiment thereof. In the accompanying drawings illustrating such embodiment:

Figure 1 includes a front end view of one of the floor trucks, showing the selective switch operating device on the truck, this view also illustrating, more or less diagrammatically, the chain drive of the trucks and the magnetic floor switch connection with the signalling apparatus at one of the stations;

Figure 2 is a view of the same from the side;

Figure 3 is a fragmentary front elevational view on a larger scale showing the station selecting device and its adjustable mounting on the truck;

Figure 4 is a side view of the adjustable station selecting device corresponding to a section taken approximately on the plane of the line 4—4 of Figure 3;

Figure 5 is a schematic fragmentary view of a typical truck conveyor installation, showing how the several magnetic switches in the floor have different transverse spacings from the conveyor chain and its chain slot, which different transverse spacings establish the station selections or the different station signalling channels;

Figure 6 is a transverse sectional view through one of the magnetic floor switches;

Figure 7 is a longitudinal sectional view of the same, these two views illustrating the switch operating roller in its actuating position above the switch, and showing the switch parts in the actuated, circuit closing positions they assume when the roller is in this switch actuating position above the permanent magnet of the switch;

Figure 8 is a diagrammatic illustration of the time delay relay and the circuit connections embodied in the signalling apparatus of each station; and Figure 9 is a fragmentary diagrammatic section of the pneumatic time delay mechanism of the relay.

In Figures 1 and 2, I have illustrated at 20 a trackless type of floor supported truck for tow-type chain conveyor systems, such as I have above described. This truck comprises the usual load supporting platform 21 having pairs of front and rear supporting wheels 22, 22'; the platform being also provided with end rails 23 or load confining bins or the like. The front supporting wheels may be swiveled for castering movement, or may be arranged for dirigible steering movement, so as to facilitate turning movement of the truck around curves, and also to facilitate maneuvering the truck out of the line of travel of succeeding trucks, when a particular truck is to be stopped at a selected station. To facilitate this latter operation of taking any truck out of the line of travel of succeeding trucks and wheeling it manually off to one side near a selected station, it is important that the floor 27 have a relatively smooth surface, free of tracks, signalling projections or any stops, slots, cavities, etc. which would interfere with the free rolling movement of the truck wheels 22, 22' over the floor surface.

The endless conveyor chain which tows the successive trucks 20 along the line of travel of the truck dispatch system is indicated at 25, this chain travelling in a chain slot 26, which is recessed in the floor 27. Such towing chains are old and well known, and the details thereof form no part of the present invention. Suffice it to say that at regularly spaced intervals the chain is supported on rolling wheels 29 which travel along track surfaces in the chain slot 26. The front and rear wheels 22, 22' of each truck have flat tread surfaces which are substantially wider than the chain slot 26, so that the wheels cannot drop into the chain slot when the truck is being manually maneuvered out of the line of travel of succeeding trucks, as above described. At regularly spaced points the chain is provided with driving dogs 31 (Figure 2) for establishing towing connection with the trucks. Each driving dog 31 has a sloping forward nose 32 leading up to a driving notch 33 extending down from the top of the driving dog. A coupling bar 35 is mounted for vertical reciprocatory movement at the front end of each truck 20 whereby the lower end of this coupling bar can be dropped down into the chain slot 26 for engagement in the driving notch 33 of a driving dog 31, and can be uncoupled from this driving dog by merely lifting the coupling bar upwardly. The guideways for this vertically reciprocable coupling bar comprise two spaced angle bars 37 and 38 secured to the front frame structure of the truck. The left hand angle bar 37 extends upwardly to a greater height than the right hand angle bar 38, and the top edges of both angle bars are formed with retaining notches 39, 39' into which is adapted to drop the bent over upper end 41 of the coupling bar 35. By lifting the handle portion 41 out of the notch 39 in the top of angle bar 37 and swinging this handle portion through 180°, the lower end of the coupling bar can be dropped down into the chain slot in position to latch into a driving notch 33. To uncouple the truck from the conveyor chain the handle 41 is merely lifted out of the notch 39' in angle bar 38 and raised and dropped into the notch 39 in angle bar 37. In raising the coupling bar 38 to this uncoupled position, the lower end of the bar is lifted entirely out of the chain slot 26, so that the truck can be instantly wheeled manually out of the line of travel of succeeding trucks without any interference from the coupling bar.

Referring now to the station selecting switch operating device which is carried by each truck 20, this device is designated 45 in its entirety and is preferably mounted at the front end of the truck, as shown in Figures 1 and 2. Such switch operating device can be mounted selectively in any one of a plurality of different positions which are spaced transversely across the front of the truck (Figure 1). These positions are denoted by numbered notches formed in the upper edge of a selector bar 46 which is secured to the front of the truck. Formed in the center of the bar, directly above the line of the chain slot 26, is a relatively shallow notch 47 which is designated N to indicate that this is the neutral notch, i. e. no signal function occurs when the switch operating device 45 is mounted in this notch. To the left of this neutral notch 47 is formed a series of equally spaced deeper notches 48, designated 1-2-3-4, and to the right of this neutral notch 47 is another similar series of equally spaced deeper notches 48, designated 5-6-7-8. Thus, the switch operator 45 can be placed selectively at any one of eight different switch operating positions spaced transversely across the front of the truck 20, in each of which positions the device 45 is operative to operate a selected floor switch which is individual to a selected station along the line of travel defined by the endless conveyor chain 25. It will, of course, be understood that the reference to eight stations is merely illustrative, and that the system may have a greater or lesser number of stations. Also, if necessary, I can employ combinations using two actuators, which would provide for upwards of twenty stations. It is appropriate at this point to point out that the endless conveyor chain 25 usually travels in a closed loop, at one point of which is the main dispatching station from which the trucks are started along the route of the successive stations. For example, in large warehouses or stock rooms where items are either to be picked from stock or placed in stock at different stations, the dispatcher writes up the list of material to be picked from stock or placed in stock at the different stations, and usually accompanies this with a route sheet indicating the routing of the truck. This data is attached to the truck and the dispatcher then places the station selecting device 45 in the appropriate notch 48 corresponding to the first station at which the truck is to stop along the route. Thereupon the coupling bar 35 is connected to the conveyor chain and the truck proceeds along the route.

Referring now to the detail construction of one preferred embodiment of this station selecting switch operator 45, it will be seen from Figures 3 and 4 that it comprises a U-shaped bracket 51 having front and rear plate portions 52 and 53 which embrace the front and back sides of the station selector bar 46. The rear plate portion 53 is extended upwardly substantially above the top edge of the selector bar 46 and is bent forwardly in the form of a handle 54 by which the bracket 51 can be lifted vertically relatively to the selector bar 46 and then moved sidewise along the selector bar to the different station selecting positions. A rivet 55 passing transversely through the plate portions of the bracket has its shank 56 arranged to function as a detent pin or stop adapted to be dropped down into the notches 47 or 48. The clearance space 57 in the bracket 51 below the selector bar 46 permits the bracket 51 to be lifted to a position for clearing the rivet shank 56 from the notches 47 or 48 for sidewise shifting of the bracket. A short section of channel bar 58 is preferably welded between the front and rear plate portions of the bracket above the rivet 55, so as to provide a greater sidewise span of bearing area on the top edge of the selector bar 46, whereby to insure that the lower part of the device will hang straight down below the selected notch. A sight aperture 59 is formed in the front plate portion 52 through which the numbers 61, designating the different station selecting notches, can be viewed when the station selecting device is in that corresponding notch.

Welded, or otherwise secured, to the lower end of the bracket 51 is a short tubular socket 62 in which is secured the upper end of a closely wound mounting spring 64. The spring is suspended in the socket by an eye 65 in the upper end of the spring hooking over a transverse pin 66 passing through the socket, and the spring is also firmly clamped in the socket by front and rear set screws 68 bearing against the spring. The lower end of the spring 64 extends down into the upper end of a tubular socket 71 in which the spring is firmly clamped by the set screws 72. Secured to the lower end of this spring socket 71 is a clevis or roller saddle 74 having downturned apertured ends 75 through which passes a pintle or axle pin 76. Mounted on bearing sleeves 77 carried by this pintle is a roller 78 composed of magnetic material, such as steel or iron. This roller effects the magnetic actuation of the magnetic floor switches at the selected stations, as will be presently described. The parts are preferably so adjusted that the roller 78 is supported out of contact with the floor 27, but in such close proximity thereto as to enable the roller to effectively actuate the magnetic switches embedded in the floor. The mounting of the roller at the lower end of the downwardly extending spring 64 permits the roller to be deflected rearwardly and thereby avoid breakage of parts if the roller should strike a high spot in the floor or some other obstruction on the floor.

Referring now to the details of construction of one preferred type of magnetic floor switch which I may employ in my signalling apparatus, Figures 6 and 7 illustrate such a switch in transverse and longitudinal section, the switch being designated 81 in its entirety. The operating parts of the switch are enclosed within a rectangular main box or housing 82 preferably formed of a non-magnetic material, such as brass. This switch box 82 is in turned set down into an outer housing or box 83 which is set down in a recess formed in the floor 27. The inner box 82 is secured to the outer box 83 by cap screws 84 which pass down through an intermediate spacer member 85 and tap into threaded holes in the outer box 83. The open tops of both boxes are closed by a cover 87 composed of some suitable non-magnetic material, such as brass, this cover being secured with a water tight fit to one or both boxes so as to prevent the possibility of water reaching the switch parts.

The magnetic element which is adapted to actuate the switch in response to the travel of the steel roller 78 over the switch box is in the form of a C-shaped or crescent-shaped permanent magnet 88. The two pole extremities 89 of this magnet face upwardly directly beneath the non-magnetic cover plate 87, so that when the steel roller 78 passes above the magnet the flux lines passing through the roller will tend to move the magnet 88 in an upward direction. Figures 6 and 7 show the magnet in this upwardly attracted position, responding to the proximity of the steel roller 78, in which position the switch contacts are closed. The magnet is mounted on a pivoted carrier 91 comprising a magnet receiving block or head 92 at one end and a horizontally extending switch actuating arm 93 at the other end. This carrier is composed of non-magnetic material, and the permanent magnet 88 embraces or partially surrounds the magnet carrying head portion 92. The pivotal movement of this assembly occurs about a horizontal pivot pin 94 which passes through the upper part of the head portion 92 and has its ends mounted in bearing bosses or bearing openings in the side walls of the switch box 82.

Carried by the outer end of the arm 93 is a downwardly extending contact plunger 96 provided with a movable contact button or surface 97 at its lower end. This movable contact 97 is adapted to engage a stationary contact 98 supported on a bracket 99 which is suitably secured to an insulating mounting plate 101. In instances where the carrier head 92 and arm 93 are composed of brass or other non-magnetic metal it is desirable to insulate the contact plunger 96 therefrom, as by providing an insulating bushing 102 in the aperture of arm 93 and by providing insulating washers 103 on the upper and lower sides of the arm. The upper end of the contact rod or plunger 96 is threaded for the reception of an adjusting nut 104, a lock washer 105 being preferably provided under the nut for holding it in adjusted position. A light compression spring 106 is confined between the lower washer 103 and a shoulder or collar 107 on the contact plunger 96. The plunger 96 can slide freely through the bushing 102 and washers 103, so that when the movable contact engages the stationary contact the spring 106 yields slightly and the contacts are maintained in engagement under spring pressure. The nut 104 enables the points of engagement and separation of the two contacts to be adjusted as desired.

Upward movement of the arm 93 in the contact separating operation is cushioned or limited by a yieldable end stop 111 passing down through an aperture 113 in the arm 93 and provided with a threaded lower end 114 which screws into a supporting standard 115 extending upwardly from the bottom of the casing 82. When the arm 93 swings upwardly after the steel roller 78 passes beyond the switch box a washer 116 on the upper side of the arm is adapted to engage a stop shoulder 117 carried by the stop pin 111. The stop shoulder 117 may be formed as an integral part of the pin, although it is preferably made adjustable by forming it as part of a spacer sleeve 118 which can be adjusted vertically by adjusting nuts 119 screwing over the threaded upper end of the stop pin 111. A light compression spring 121 cushions and silences the upward movement of the washer 116 against the shoulder 117, and this may be further augmented by a small O ring 122 of rubber or synthetic resilient material. Electrical connection with the circuit to be controlled is established with the plunger rod 96 which carries the movable contact 97, and with the bracket 99 which carries the stationary contact 98. The conductors connecting with these contacts are extended from the box through any suitable type of conductor conduit to the signalling apparatus located at the station individual to that particular floor switch 81.

As shown in Figure 5, which diagrammatically illustrates the line of travel of the trucks past successive stations, such as stations 2, 4 and 7, the magnetic floor switches 81 are embedded in the floor preferably a substantial distance in advance of their respective stations, so that they will give a signalling indication at the station prior to the arrival of the truck at that station. As will be understood from the foregoing, the selective response of the different floor switches is obtained by locating them at different transverse distances to right or left of the chain slot 26 in the floor, thereby coding or establishing different station signalling channels spaced transversely across the line of travel of the trucks. For example, the floor switch 81 of station 2 would be spaced laterally to the left of the chain slot a distance which would place it in station signalling channel #2 substantially under notch #2 on the truck selector bar 46; the floor switch 81 of station 4 would also be located to the left of the chain slot 26, but in close proximity thereto, in station signalling channel #4 under notch #4 in the selector bar; and the floor switch 81 of station 7 would be located on the opposite or right hand side of the chain slot 26, so as to be in station signalling channel #7 under notch #7 of the selector bar.

Figures 8 and 9 diagrammatically illustrate one preferred combination and arrangement of signal apparatus which I preferably employ at each station for responding to the operation of the floor switch 81 individual to that station. I preferably employ a signal lamp 125 for visual signalling and a bell, buzzer or chime 126 for audible signalling, although either one may be employed alone, if desired. The lamp 125 and the bell, buzzer or gong 126 are illustrated as being grouped together, but they may be located separately at different desired points. The circuit 127 for the lamp and the circuit 128 for the bell or chime both connect to the end terminals of secondary winding 129 of transformer 131. The primary winding 132 of this transformer is adapted to be energized from the supply source 133 by a suitable time delay switch 135 which is adapted to connect the supply circuit to the transformer primary 132 immediately upon closing of the contacts in the floor switch 81. The time delay characteristic of this switch or relay 135 enables the device to be set for maintaining the transformer winding 132 energized for substantially any desired time interval after the floor switch contacts have opened, whereby any desired length of signalling interval may be obtained. It will be understood that any preferred type or construction of time delay switch 135 may be employed, but for illustrative purposes I have diagrammatically shown a pneumatically timed type wherein the time delay is obtained by the passage of air through an adjustably metered orifice. This time delay relay is diagrammatically illustrated as comprising a pivotally swinging contact 137 adapted to have a sliding wiping engagement with a stationary contact 138, these two contacts controlling a circuit 141, 142 extending from the supply circuit 133 to the transformer primary 132. The movable contact 137 is adapted to be actuated by a hook extension 143 at the lower end of a reciprocable stem 144. This stem carries a magnetic core 145 which is adapted to respond to a solenoid winding 146, the core 145 normally standing in an elevated position with respect to the winding, but being sucked down into the winding upon the energization of the latter. A suitable spring 147 normally holds the stem and solenoid core in the elevated position shown. The upper end of the stem is connected to a flexible bottom wall or diaphragm 151 of a pneumatic chamber 150. As shown in greater detail in Figure 9, this chamber is provided with any suitable quick acting inlet valve 152, such as a flap valve, for quickly admitting air into the chamber upon the downstroke of the solenoid core 145. Such a quick opening flap valve is shown as being mounted around the upper end of the shank 144. The discharge of air from the pneumatic chamber 150 is adapted to be controlled through a discharge orifice 155 which can be adjusted to any desired size by an adjustable metering pin 156 adapted to be screwed into or out of the orifice. These pneumatic time delay relays can be adjusted from a signalling interval as short as 1/10 of a second to a signalling interval as long as 10 minutes. The solenoid winding 146 is connected in series with the supply circuit and floor switch 81 through circuit connections 161—163, so that instantly upon closing of the contacts 97, 98 in the floor switch 81 the relay 135 is operated to start the signalling operation at the station individual to that floor switch 81. If the audible signalling device 126 is a chime instead of a bell, it may be desirable to insert an automatic flasher 158 in the circuit 141—142 to obtain repeated operation of the chime. It is believed that the general operation of the system and apparatus will be apparent from the preceding description.

While a floor type conveyor has been illustrated, the system of control can be used equally well in a system whereby the trucks are propelled by an overhead type conveyor.

While I have illustrated and described what I regard to be the preferred embodiment of my invention, nevertheless it will be understood that such is merely exemplary and that numerous modifications and rearrangements may be made therein without departing from the essence of the invention.

I claim:

1. In station selecting signal apparatus for truck conveyor systems wherein a plurality of trackless floor-supported trucks of dirigible-wheel type are adapted to be propelled over the surface of a substantially flat trackless floor by a drag-line conveyor chain traveling along a predetermined path of towed travel, and wherein each truck can be uncoupled from said conveyor chain so that it can be manually maneuvered out of the path of succeeding trucks to a laterally disposed point in proximity to a selected station, the combination therewith of electrical signal apparatus at each of said stations, a magnetic floor switch for each station disposed entirely below the surface of the floor adjacent to its respective station so as to avoid interference with said manual maneuvering of the truck when uncoupled from said conveyor chain, said magnetic floor switches being spaced transversely across said path of towed travel different predetermined distances to establish different station signalling channels spaced transversely across the line of travel of said trucks, each of said floor switches comprising contact means controlling the electrical signal apparatus of its respective station and also including a movably mounted permanent magnet operable upon movement to cause actuation of said contact means, switch operating apparatus carried by each truck for selectively actuating said floor switches, said switch operating apparatus comprising a selector bar extending transversely of one end of each truck and having spaced notches in its upper edge spaced to correspond to the aforesaid station signalling channels spaced transversely across the line of travel of the truck, a slide bracket slidably movable along said selector bar and comprising detent means adapted to have selective registration with different ones of said notches, a spring extending downwardly from said slide bracket, and a roller of paramagnetic material carried at the lower end of said spring adapted to cause movement of the permanent magnet in the floor switch of the station signalling channel being traversed by said roller, the adjustment of said slide bracket along said selector bar predetermining the station signalling channel and the particular floor switch or switches which are to respond to that truck.

2. In station selecting signal apparatus for truck conveyor systems wherein a plurality of trackless floor-supported trucks of dirigible-wheel type are adapted to be propelled over the surface of a substantially flat trackless floor by a drag-line conveyor chain traveling along a predetermined path of towed travel, and wherein each truck can be uncoupled from said conveyor chain so that it can be manually maneuvered out of the path of succeeding trucks to a laterally disposed point in proximity to a selected station, the combination therewith of electrical signal apparatus at each of said stations, a magnetic floor switch for each station disposed entirely below the surface of the floor adjacent to its respective station so as to avoid interference with said manual maneuvering of the truck when uncoupled from said conveyor chain, said magnetic floor switches being spaced transversely across said path of towed travel different predetermined distances to establish different station signalling channels spaced transversely across the line of travel of said trucks, each of said floor switches comprising contact means controlling the electrical signal apparatus of its respective station and also including a movably mounted permanent magnet operable upon movement to cause actuation of said contact means, switch operating apparatus carried by each truck for selectively actuating said floor switches, said switch operating apparatus comprising a selector bar extending transversely of one end of each truck and having spaced notches in its upper edge spaced to correspond to the aforesaid station signalling channels spaced transversely across the line of towed travel of the truck, a slide bracket slidably movable along said selector bar and comprising detent means adapted to have selective registration with different ones of said notches, a spring extending downwardly from said slide bracket, a roller carried at the lower end of said spring and normally maintained at a slight spacing from the floor, said spring permitting said roller to be deflected resiliently if it should encounter obstructions in or on the floor, said roller being composed of magnetic material and being operative to cause response of the permanent magnet in the floor switch of any station signalling channel being traversed by said roller, a timing relay responsive to said electrical signal apparatus, and adjusting means for adjusting said timing relay so as to increase or decrease the duration of the signalling interval at that station.

3. In station selecting signal apparatus for truck conveyor systems wherein a plurality of floor supported dirigible trucks are adapted to be propelled by a conveyor chain along a predetermined path of towed travel over a trackless floor past a plurality of stations, and wherein each truck can be uncoupled from the conveyor chain so that it can be manually maneuvered across the floor out of the path of travel of succeeding trucks to a laterally disposed standby position adjacent to a selected station, the combination therewith of electrical signal apparatus at each of said stations, a magnetic floor switch for each station disposed entirely below the surface of the floor adjacent to its respective station so as to avoid interference with said manual maneuvering of the truck when uncoupled from said conveyor chain, said magnetic floor switches being located in selected ones of a plurality of parallel station signalling channels located at different points spaced transversely across the width of said predetermined path of towed travel, each of said floor switches comprising contact means controlling the electrical signal apparatus of its respective station and also including a movably mounted permanent magnet operable upon movement to cause actuation of said contact means, switch operating apparatus carried by each truck for selectively actuating said floor switches, said switch operating apparatus comprising a selector bar extending transversely of one end of each truck and having spaced notches in its upper edge spaced to correspond to the aforesaid station signalling channels spaced transversely across the line of towed travel of the truck, a slide bracket slidably movable along said selector bar and comprising detent means adapted to have selective registration with different ones of said notches, a spring extending downwardly from said slide bracket, a roller carried at the lower end of said spring and normally maintained at a slight spacing from the floor, said spring permitting said roller to be deflected resiliently if it should encounter obstructions in or on the floor, said roller being composed of magnetic material and being operative to cause response of the permanent magnet in the floor switch of any station signalling channel being traversed by said roller, a timing relay responsive to said electrical signal apparatus, and adjusting means for adjusting said timing relay so as to increase or decrease the duration of the signalling interval at that station.

4. In station selecting signal apparatus for truck conveyor systems wherein a plurality of floor supported dirigible trucks are adapted to be propelled by a conveyor chain along a predetermined path of towed travel over a trackless floor past a plurality of stations, and wherein each truck can be uncoupled from the conveyor chain so that it can be manually maneuvered across the floor out of the path of travel of succeeding trucks to a laterally disposed standby position adjacent to a selected station, the combination therewith of electrical signal apparatus at each of said stations, a magnetic floor switch for each station disposed entirely below the surface of the floor adjacent to its respective station so as to avoid interference with said manual maneuvering of the truck when uncoupled from said conveyor chain, said magnetic floor switches being located in selected ones of a plurality of parallel station signalling channels located at different points spaced transversely across the width of said predetermined path of towed travel, each of said floor switches comprising contact means controlling the electrical signal apparatus of its respective station and also including a movably mounted permanent magnet operable upon movement to cause actuation of said contact means, switch operating apparatus carried by each truck for selectively actuating said floor switches, said switch operating apparatus comprising a selector bar extending transversely of one end of each truck and having spaced notches in its upper edge spaced to correspond to the aforesaid station signalling channels spaced transversely across the line of towed travel of the truck, a slide bracket slidably movable along said selector bar and comprising detent means adapted to have selective registration with different ones of said notches, a spring extending downwardly from said slide bracket, and a paramagnetic member carried at the lower end of said spring and normally maintained at a slight spacing from the floor, said spring permitting said paramagnetic member to be deflected resiliently if it should encounter obstructions in or on the floor, said paramagnetic member being operative to cause response of the permanent magnet in the floor switch of any station signalling channel being traversed by said paramagnetic member, the adjustment of said slide bracket along said selector bar predetermining the station signalling channel and the particular floor switch or switches which are to respond to that truck.

5. In station selecting signal apparatus for truck conveyor systems wherein a plurality of floor supported dirigible trucks are adapted to be propelled by a conveyor chain along a predetermined path of towed travel over a trackless floor past a plurality of stations, and wherein each truck can be uncoupled from the conveyor chain so that it can be manually maneuvered across the floor out of the path of travel of succeeding trucks to a laterally disposed standby position adjacent to a selected station, the combination therewith of electrical signal apparatus at each of said stations, a magnetic floor switch for each station disposed entirely below the surface of the floor adjacent to its respective station so as to avoid interference with said manual maneuvering of the truck when uncoupled from said conveyor chain, said magnetic floor switches being located in selected ones of a plurality of parallel station signalling channels located at different points spaced transversely across the width of said predetermined path of towed travel, each of said floor switches comprising contact means controlling the electrical signal apparatus of its respective station and also including a movably mounted permanent magnet operable upon movement to cause actuation of said contact means, switch operating apparatus carried by each truck for selectively actuating said floor switches, said switch operating apparatus comprising a selector bar extending transversely of one end of each truck and having spaced notches in its upper edge spaced to correspond to the aforesaid station signalling channels spaced transversely across the line of towed travel of the truck, a slide bracket slidably movable along said selector bar and comprising detent means adapted to have selective registration with different ones of said notches, and a paramagnetic member carried at the lower end of said slide bracket adapted to cause movement of the permanent magnet in the floor switch of the station signalling channel being traversed by said paramagnetic member, the adjustment of said slide bracket along said selector bar predetermining the station signalling channel and the particular floor switch or switches which are to respond to that truck.

6. In station selecting signal apparatus for truck conveyor systems wherein a plurality of floor supported dirigible trucks are adapted to be propelled by a conveyor chain along a predetermined path of towed travel over a trackless floor past a plurality of stations, and wherein each truck can be uncoupled from the conveyor chain so that it can be manually maneuvered across the floor out of the path of travel of succeeding trucks to a laterally disposed standby position adjacent to a selected station, the combination therewith of electrical signal apparatus at each of said stations, separate switch means for controlling the electrical signal apparatus of each station, said switch means being disposed below the surface of the floor adjacent to its respective station and being spaced transversely across said path of towed travel in a predetermined station selecting channel coded to its particular station, switch operating means carried by each truck for effecting the operation of said separate switch means, one of said means comprising a magnet and the other of said means comprising a member of magnetic material adapted to coact with said magnet for causing actuation of said switch means independently of any contact between said switch means and said switch operating means, and selector apparatus for selectively mounting said switch operating means on each of said trucks comprising a selector bar extending transversely of one end of each truck and having spaced notches in its upper edge spaced to correspond to the aforesaid station signalling channels spaced transversely across the line of towed travel of the truck, a slide bracket slidably movable along said selector bar, and detent means carried by said bracket adapted to have selective registration with different ones of said notches, said switch operating means being carried at the lower end of said slide bracket whereby the adjustment of said slide bracket along said selector bar predetermines the station signalling channel which is to respond to that truck.

7. In station selecting signal apparatus for truck conveyor systems wherein a plurality of floor supported dirigible trucks are adapted to be propelled by a conveyor chain along a predetermined path of towed travel over a trackless floor past a plurality of stations, and wherein each truck can be uncoupled from the conveyor chain so that it can be manually maneuvered across the floor out of the path of travel of succeeding trucks to a laterally disposed standby position adjacent to a selected station, the combination therewith of electrical signal apparatus at each of said stations, separate switch means for controlling the electrical signal apparatus of each station, said switch means being disposed below the surface of the floor adjacent to its respective station and being spaced transversely across said path of towed travel in a predetermined station selecting channel coded to its particular station, switch operating means carried by each truck for effecting the operation of said separate switch means, one of said means comprising a magnet and the other of said means comprising a member of magnetic material adapted to coact with said magnet for causing actuation of said switch means independently of any contact between said switch means and said switch operating means, and selector apparatus for selectively mounting said switch operating means on each of said trucks comprising a selector bar extending transversely of one end of each truck, and a slide bracket carrying said switch operating means at its lower end and movable to different positions along said selector bar, whereby the selected location of said bracket along said bar predetermines the station signalling channel which is to respond to that truck.

References Cited in the file of this patent

UNITED STATES PATENTS

| | | |
|---|---|---|
| 382,515 | De Redon | May 8, 1888 |
| 506,770 | Cranston | Oct. 17, 1893 |
| 586,920 | Wellman | July 20, 1897 |
| 668,819 | Hume | Feb. 26, 1901 |
| 1,243,457 | Stuart | Oct. 16, 1917 |
| 1,463,244 | Bogard | July 31, 1923 |
| 1,709,212 | Green | Apr. 16, 1929 |
| 2,022,186 | Butler | Nov. 26, 1935 |
| 2,082,741 | Phinney | June 1, 1937 |
| 2,194,057 | Simpson | Mar. 19, 1940 |
| 2,368,745 | Crago | Feb. 6, 1945 |
| 2,488,758 | Binford | Nov. 22, 1949 |
| 2,489,113 | Veenstra | Nov. 22, 1949 |
| 2,489,381 | Lindahl | Nov. 29, 1949 |
| 2,601,477 | Webb et al. | June 24, 1952 |
| 2,619,370 | Leger | Nov. 25, 1952 |
| 2,621,609 | McCaul et al. | Dec. 16, 1952 |
| 2,635,555 | Hansson | Apr. 21, 1953 |
| 2,708,886 | Neely | May 24, 1955 |

FOREIGN PATENTS

| | | |
|---|---|---|
| 117,914 | Germany | June 10, 1930 |